United States Patent [19]

Vargiu et al.

[11] 3,859,235
[45] Jan. 7, 1975

[54] MODIFIED ALKYD RESIN COMPOSITIONS FOR PAINTS AND VARNISHES COMPRISING OXALIC ACID

[76] Inventors: Silvio Vargiu; Beppino Passalenti, both of Milan; Edoardo Carpaneti, Genova, all of Italy; Societa Italiana Resine S.I.R. S.p.A., 03, Milan, Italy

[22] Filed: Oct. 25, 1972

[21] Appl. No.: 300,693

[30] Foreign Application Priority Data
Dec. 27, 1971  Italy .................................. 32953/71

[52] U.S. Cl.......... 260/22 CB, 117/148, 117/161 K, 260/22 A, 260/23 P
[51] Int. Cl. ........................... C09d 3/64, C09d 3/80
[58] Field of Search..... 260/22 A, 865, 866, 22 CA, 260/22 CB

[56] References Cited
UNITED STATES PATENTS
1,950,468   3/1934   Zwilgmeyer ..................... 260/22 A
2,153,511   4/1939   Cheetham et al.................. 260/22 A
2,407,479   9/1946   D'Alelio............................. 260/861
2,664,413   12/1953  Parker ................................ 260/866
2,829,120   4/1958   Parker ................................ 260/865
3,390,121   6/1968   Burford et al. .................... 260/22 A FOREIGN PATENTS OR APPLICATIONS
1,004,171   7/1962   Great Britain ................ 260/22 CA OTHER PUBLICATIONS
Singer, Fundamentals of Paint, Varnish and Lacquer Technology, 1957, pages 45–51.

*Primary Examiner*—Ronald W. Griffin
*Attorney, Agent, or Firm*—Sughrue, Rothwell, Mion, Zinn & Macpeak

[57] ABSTRACT

Paints and varnishes comprising modified acrylic resins and cobalt naphthenate and similar driers, contain a small amount of oxalic acid to prevent development of greenish colourings on drying.

5 Claims, No Drawings

MODIFIED ALKYD RESIN COMPOSITIONS FOR PAINTS AND VARNISHES COMPRISING OXALIC ACID

The present invention relates to an improved composition comprising a modified alkyd resin suitable for varnishes and paints.

More particularly, the invention relates to improvements relative to those compositions for varnishes and paints which comprise an alkyd resin modified with acrylic monomers, and one or more metallic salts of organic acids as driers.

The term alkyd resin is understood as denoting the products of condensation between polyhydroxylic alcohols, polycarboxylic acids and drying oils.

The term modified alkyd resin is associated with the modifications made to the above-mentioned alkyd resin by reaction with chemical agents other then those specified and generally with acrylic monomers.

It is furthermore known that, in industry, the term varnish is intended to mean a product of a natural or synthetic resinous nature capable of forming films when dried by means of one or more driers, possibly in the presence of a diluent. If a pigment is added to such a composition, a paint is obtained.

Recently, compositions based on alkyd resins modified with acrylic monomers have been widely used in the varnish and paint sector for the speed with which they dry in the air, the economical nature of the carrier and the satisfactory mechanical and physico-chemical characteristics of the film obtained.

Such compositions generally contain one or more metallic soaps as driers, such metallic soaps being constituted by salts of alkaline earth metals or heavy metals with monobasic carboxylic acids, containing 7 to 22 carbon atoms in the molecule.

The metallic soap most used for the purpose is cobalt naphthenate, both because the cobalt is highly active as a drier and because the salts of naphthenic acid are very stable.

The cobalt salt is normally used in combination with salts of other metals, particularly lead.

Cobalt does in fact have the property of encouraging surface drying while the lead encourages drying at depth.

It is also possible to use for the purpose a manganese salt such as for example manganese naphthenate, which allows hard and resistant films to be obtained.

The varnishes and paints based on alkyd resins modified with acrylic monomers, which contain a cobalt salt as a drier, are not however completely satisfactory above all due to the greenish shading which the paint and varnish assumes during the drying process.

Such shading, in the case of varnishes, is all the more obvious the lighter the surface to which the varnish is applied, as in the case of light woods of the maple, poplar, or other types.

In the case of paints, the lighter the colour involved, the greater will be the variation.

If the composition also includes a lead salt, this undesired phenomenon is still more accentuated.

In order to avoid the drawbacks described, other soaps could be used, such as for example those of calcium, zinc, cerium or zirconium, but in these cases disadvantages would arise due to the low rates of drying and incompleteness of the drying itself.

It has now been found possible to avoid the disadvantages of the prior art relative to those compositions for varnishes and paints, based on alkyd resins modified with acrylic monomers, which contain as a drier a cobalt salt of an organic acid, alone or in combination with salts of organic acids with other metals.

The present invention is based essentially on the discovery that the said compositions do not exhibit undesired phenomena of colour on drying, or at least such phenomena are greatly reduced, when drying is carried out in the presence of measured quantities of at least one substance having reducing characteristics and particularly oxalic acid.

Therefore, the compositions for varnishes and paints of the present invention comprise: an alkyd resin modified with acrylic monomers, a cobalt salt of an organic acid possibly in combination with a salt of lead or manganese, and oxalic acid, this last-mentioned being present in quantities from 0.025 to 0.1 parts by weight for every 100 parts by weight of the actual resin.

It has in fact been found that within such a range of concentration of oxalic acid, the best results are achieved relative to the absence of colour in the hardened products, while there is no negative effect on the progress of drying.

Alkyl resins which are useful for the purposes of the present invention are those normally known in the art which are prepared by reaction between polycarboxylic acids or their anhydrides, polyhydroxylic alcohols and drying oils.

The polycarboxylic acids normally used are isophthalic, adipic and azelaic acids, or the anhydrides such as those of maleic or phthalic acids. The polyhydroxylic alcohols used are normally chosen from the group consisting of glycerol, pentaerythritol, trimethylolpropane and sorbitol.

As drying oils, it is possible to use soya bean oil or the oils of linseed, dehydrated ricin, cotton seed and coconut.

The preparation of the alkyd resin is normally carried out with molar ratios of polycarboxylic acid to polyhydroxylic alcohol of 0.7 : 1 to 0.9: 1, while the drying oil is used in quantities of 20 to 60% by weight with respect to the reagent mixture.

Furthermore, condensation is carried out in an inert gas atmosphere working at increasing temperatures up to approximately 240° to 250°C, so as to obtain a resin having characteristics between the range of values:

acid number 5 to 20
viscosity 250 to 900 cps in a 60% xylene solution.

The resultant alkyd resin is subsequently modified with an acrylic monomer, the latter being chosen from the class comprising the methyl, ethyl or butyl esters of acrylic or methacrylic acid.

For this purpose, the alkyd resin is caused to react with a quantity of acrylic monomer ranging from 20 to 100 parts by weight for every 100 parts by weight of the resin itself.

The reaction is normally carried out at temperatures from 100° to 150°C, in the presence of a diluent such as toluene, xylene, or aromatic hydrocarbons in general, or mixtures of these with aliphatic hydrocarbons.

In addition, the reaction is catalysed by peroxides or hydroperoxides such as for example cumene hydroperoxide, ditertiarybutylperoxide and benzoylperoxide.

Such peroxides or hydroperoxides are normally added in quantities of 0.5 to 3.0 parts by weight per 100 parts by weight of acrylic monomer.

At the end of the reaction, the traces of unreacted acrylic monomers are eliminated and a modified alkyd resin is obtained which has characteristics within the following ranges:

| | |
|---|---|
| dry residue | approximately 50% |
| viscosity | 500 to 3,500 cps. at 25° C |
| acid number | below approximately 12 |
| Gardner colour | below approximately 4. |

According to the present invention, a cobalt salt of an organic acid and possibly also a salt of lead or manganese, in addition to the oxalic acid, is added to the alkyd resin modified with acrylic monomers, diluted with an appropriate solvent. More particularly, the cobalt salts used may be cobalt naphthenate, octoate or phthalate, in quantities such as will ensure a concentration (calculated as metal) of 25 to 150 ppm in the modified alkyd resin. In the event of lead salts being used (such as for example lead naphthenate, octoate or phthalate), the concentration of the metal may be as much as 300 ppm. Finally, the manganese salts (such as for example manganese naphthenate, octoate or phthalate) may be present in such quantities as will ensure a concentration (calculated as metal) of up to 100 ppm. In order to achieve the objects of the present invention, the presence of oxalic acid is essential in the compositions for varnishes or paint according to the present invention.

As stated previously, quantities of oxalic acid of 0.025 to 0.1 parts by weight for every 100 parts by weight of the alkyd resin modified with acrylic monomers are used.

For values below 0.025 parts by weight, no appreciable improvements are in fact obtained relative to the colouring of the hardened products. Moreover, it is not advisable to go to values higher than 0.1 parts by weight, in that troubles occur, essentially due to the negative effect exerted on the rate of drying. Oxalic acid may be added as such to the alkyd resin modified with acrylic monomers or, in the preferred form, it maybe added dissolved in organic solvent, the said solvent being chosen from among the ketones, alcohols, glycols or esters. The paints according to the present invention are obtained according to known techniques, pigment being incorporated into the compositions for varnishes which contain the alkyd resin modified with acrylic monimers, one or more metallic soaps and oxalic acid.

For example, the pigment may be ground together with a fraction of the composition for varnishes, the result being passed through a suitable mill fine enough to achieve a fine dispersion.

This dispersion is then homogenised with the remaining portion of the varnish composition, possibly diluted with a solvent, such as for example xylene, until a mixture is obtained which has the desired viscosity values.

EXAMPLE 1

(Preparation of Alkyd Resin)

In a glass vessel with four necks, fitted with an agitator, thermometer and a system for the injection of inert gas, there are placed: dehydrated ricin oil, glycerol and phthalic anhydride in molar ratios of 1:1.67:1.5. The temperature is raised gradually to 160°C in the presence of xylene which is used as an azeotropic solvent. The temperature is then raised over 3 hours to 210° to 220°C and maintained at that temperature until a viscosity is achieved equal to 400 cps at 25°C and in a 60% xylene solution, with an acid number below 12.

The result is then cooled and diluted in xylene until dry residue is obtained equal to 60% by weight.

EXAMPLE 2

(Modification of Alkyd Resin)

The alkyd resin obtained in Example 1 and the xylene, this latter in a quantity equal to 80 parts by weight per 100 parts by weight of the resin, are introduced into a flask.

The mixture is heated, under agitation, to a temperature of 120° to 130°C, and through a separating funnel, methyl methacrylate is supplied, containing 1.5% by weight of cumene hydroperoxide.

Over a period equal to 90 minutes, the methyl methacrylate is added in a quantity equal to 60 parts by weight for every 100 parts by weight of alkyd resin. The temperature is then maintained at the said values until a virtually complete reaction of the acrylic monomer is obtained.

In this way, a mixture results which has a solids content equal to approximately 49% and a viscosity equal to 1100 cps at 25°C.

It is then cooled to 100°C and, while a pressure below ambient pressure is maintained, a small quantity of xylene is distilled together with the traces of unreacted acrylic monomer.

Fresh xylene is then added and cooled to room temperature.

EXAMPLE 3 COMPARATIVE

For every 100 parts by weight of alkyd resin modified with acrylic monomer, obtained as described in Example 2, 0.2 parts by weight of cobalt naphthenate solution (containing 2% by weight of metallic cobalt) and 0.4 parts by weight of lead naphthenate solution (containing 2% by weight of metallic lead) are added.

A viscosity of 20'' is then established, measured in a Ford No. 4 cup at 20°C, and 40 parts by weight of xylene per 100 parts by weight of modified resin are added.

The resultant varnish is applied on poplar wood by means of a spray gun operating on compressed air. The hardness of the film measured after 6 hours from being applied, at 25°C, using the Sward Rocker method, was equal to 19''.

The film had a greenish shading on a light background.

EXAMPLE 4 COMPARATIVE

Process as in Example 3 with the difference that only 0.4 parts by weight of cobalt naphthenate solution are added (containing 2% by weight of metallic cobalt).

The film had a hardness equal to 20'' and a greenish shading on the light background.

EXAMPLE 5

The procedure is the same as in Example 3, 0.4 parts by weight of cobalt naphthenate solution (containing 2% by weight of metallic cobalt), 0.006 parts by weight of manganese naphthenate (containing 2% by weight metallic cobalt) and 0.075 parts by weight of oxalic acid (in acetone solution) per 100 parts by weight of the modified alkyd resin being added.

A colourless film is obtained with a hardness equal to 23".

EXAMPLE 6

The procedure is the same as in Example 3, 0.2 parts by weight of cobalt naphthenate solution (containing 2% by weight metallic cobalt), 0.4 parts by weight of lead naphthenate solution (containing 2% by weight metallic lead), 0.06 parts by weight manganese naphthenate (containing 2% by weight metallic manganese) and 0.075 parts by weight oxalic acid (in the form of acetone solution) for every 100 parts by weight of the modified alkyd resin being added.

A colourless film is obtained with a hardness equal to 22".

EXAMPLE 7 COMPARATIVE 12 parts by weight of the resin obtained in Example 2, 25 parts by weight of pigment and 5 parts by weight xylene are charged into a 3-cylinder mill and are ground to produce a fine dispersion with a value of 6 to 7 measured on the Hegman scale. The dispersion is then mixed with 55 parts by weight of the resin obtained in Example 2. Then, 0.2 parts by weight of cobalt naphthenate solution (containing 2% by weight of metallic cobalt) and 0.4 parts by weight of lead naphthenate solution (containing 2% by weight metallic lead) for every 100 parts by weight of the modified alkyd resin are added.

The viscosity is then brought to 20", measured in a Ford No. 4 cup at 20°C, 50 parts by weight xylene for every 100 parts by weight of the modified alkyd resin of Example 2 being added. The resultant paint is applied to poplar wood by compressed air spray gun. The hardness of the film measured after 6 hours from being applied at 25°C equalled 20", using the Sward Rocker method. The film appeared with a pale green tint.

EXAMPLE 8

The procedure is the same as in Example 7, but 0.4 parts by weight of cobalt naphthenate solution (containing 2% by weight metallic cobalt), 0.006 parts by weight manganese naphthenate solution (containing 2% by weight metallic manganese), and 0.075 parts by weight oxalic acid (in the form of acetone solution) for every 100 parts by weight of the modified alkyd resin are added.

A colourless film with a hardness equal to 22" is obtained.

EXAMPLE 9

Adopting the same procedure as in Example 7, 0.2 parts by weight of cobalt naphthenate solution (containing 2% by weight metallic cobalt), 0.4 parts by weight lead naphthenate solution (containing 2% by weight metallic lead), 0.006 parts by weight manganese naphthenate solution (containing 2% by weight metallic manganese) and 0.075 parts by weight oxalic acid (in the form of acetone solution are added. The result is a colourless film with a hardness equal to 23".

EXAMPLE 10 (COMPARATIVE)

Proceed as in Example 7, adding 0.4 parts by weight cobalt naphthenate solution (containing 2% by weight metallic cobalt) for every 100 parts by weight of modified alkyd resin. The result is a film with a hardness 21", white with a pale green tint.

We claim:
1. Composition for paints and varnishes comprising
   1. an alkyd resin modified with an acrylic monomer which is a methyl, ethyl or butyl ester of acrylic or methacrylic acid in an amount ranging from 20 to 100 parts by weight per 100 parts by weight of resin, said alkyd resin comprising the reaction product of polycarboxylic acid with polyhydroxylic alcohol in the molar ratio of from 0.7:1 to 0.9:1 together with a drying oil in the amount of 20 to 60% by weight with respect to the reagent mixture, said modified alkyd resin being hardenable under the action of a metallic salt of an organic acid,
   2. a drier consisting essentially of metallic salts of organic acids, said salts being selected from the group consisting of naphthenate, octoate and phthalate, and comprising at least cobalt present in such a quantity as to ensure a concentration of metallic cobalt of 25 to 150 ppm with respect to the modified alkyd resin, and
   3. oxalic acid in a quantity of 0.025 to 0.1 parts by weight for every 100 parts by weight of the alkyd resin.
2. Compositions as in claim 1, which contain additionally a lead salt of an organic acid in such a quantity as to ensure a concentration of metallic lead up to 300 ppm with respect to the modified alkyd resin.
3. Compositions as in claim 1, which contain additionally a manganese salt of an organic acid in such a quantity as to ensure a concentration of metallic manganese up to 100 ppm with respect to the modified alkyd resin.
4. Compositions as in claim 3, which contain additionally a lead salt of an organic acid and in which the lead and manganese salts are in the form of naphthenates, octoates or phthalates.
5. Compositions as in claim 1, wherein said drying oil is chosen from the group consisting of soya bean, linseed, dehydrated ricin, cotton seed, and coconut.

* * * * *